United States Patent
Bucella et al.

(10) Patent No.: US 8,004,866 B2
(45) Date of Patent: Aug. 23, 2011

(54) METHOD AND APPARATUS TO REMOVE ENERGY FROM DC LOADS

(75) Inventors: Thomas John Bucella, Rochester, NY (US); Thomas P. Dombroski, Fairport, NY (US); David E. Fuchs, Pittsford, NY (US); Jeremy M. Block, Walworth, NY (US)

(73) Assignee: Teknic, Inc., Pittsford, NY (US)

(*) Notice: Subject to any disclaimer, the term of this patent is extended or adjusted under 35 U.S.C. 154(b) by 446 days.

(21) Appl. No.: 12/346,095

(22) Filed: Dec. 30, 2008

(65) Prior Publication Data
US 2009/0174382 A1    Jul. 9, 2009

Related U.S. Application Data

(60) Provisional application No. 61/018,726, filed on Jan. 3, 2008.

(51) Int. Cl.
*H02M 7/10* (2006.01)
(52) U.S. Cl. ......................................................... 363/50
(58) Field of Classification Search ............... 363/50, 363/52, 55, 56.03, 56.07, 56.1, 57; 323/282
See application file for complete search history.

(56) References Cited

U.S. PATENT DOCUMENTS

| | | | |
|---|---|---|---|
| 4,333,049 A | 6/1982 | Yui et al. | |
| 4,843,533 A | 6/1989 | Roof et al. | |
| 5,127,085 A | 6/1992 | Becker et al. | |
| 5,574,632 A | 11/1996 | Pansier | |
| 5,615,097 A * | 3/1997 | Cross | 363/84 |
| 5,619,127 A * | 4/1997 | Warizaya | 323/275 |
| 5,715,154 A | 2/1998 | Rault | |
| 5,920,186 A | 7/1999 | Ninh et al. | |
| 7,102,299 B2 * | 9/2006 | Jones et al. | 315/291 |
| 7,113,380 B2 | 9/2006 | Youm | |
| 7,479,771 B2 * | 1/2009 | Ryu et al. | 323/271 |
| 7,529,109 B2 * | 5/2009 | Chen et al. | 363/56.08 |

FOREIGN PATENT DOCUMENTS

JP     04-017517 A    1/1992
KR     10-2006-0090127 A    8/2006

OTHER PUBLICATIONS

International Search Report and Written Opinion for International Application No. PCT/US2008/083953. Issued Jun. 24, 2009.
International Search Report and Written Opinion for International Application No. PCT/US2008/088513. Issued Jul. 30, 2009.

* cited by examiner

*Primary Examiner* — Adolf Berhane
*Assistant Examiner* — Yemane Mehari
(74) *Attorney, Agent, or Firm* — Brown & Michaels, PC

(57) ABSTRACT

A DC output power converter or DC switch device that includes methods and apparatus to reverse the current in the connected load, thereby draining the load's energy until the voltage in the load is brought to a (near) zero potential and held there.

16 Claims, 3 Drawing Sheets

METHOD AND APPARATUS TO REMOVE ENERGY FROM DC LOADS

REFERENCE TO RELATED APPLICATIONS

This application claims one or more inventions which were disclosed in Provisional Application No. 61/018,726, filed Jan. 3, 2008, entitled "Method and Apparatus to Remove Energy from DC Loads". The benefit under 35 USC §119(e) of the United States provisional application is hereby claimed, and the aforementioned application is hereby incorporated herein by reference.

BACKGROUND OF THE INVENTION

1. Field of the Invention

The invention pertains to the field of DC power supplies. More particularly, the invention pertains to methods and apparatus for control of loads on DC power supplies.

2. Description of Related Art

In many electrical systems DC power is applied to a load (or loads) by a DC output power converter or a DC switch at the assertion of an on-off control signal or simply by applying power to the input of the DC switch or the DC output power converter. When power is removed to these devices or the device is commanded to turn off, stored energy within their load(s) dissipates passively due to energy consumption or other parasitic losses within the load. Generally, no effort is made on the part of the DC switch or DC output power converter to remove this stored energy from the DC load. In fact, DC output power converters are often designed to sustain their output as long as possible so they can deliver seamless power to their load(s) even when there are short power outages. (Within the power supply industry the ability to do this is specified as "hold-up time".)

In contrast, in certain applications, it would be an improvement not only to rapidly interrupt energy flow to DC loads, but to also remove stored energy from within the load(s) as soon as possible. Today, this is accomplished by means outside the power source: adding brakes to mechanical loads, passively draining current from capacitors, etc. These techniques require additional expense and complexity on the part of the user and/or add to the system energy losses while operating.

There is a need for DC output power converters and DC power switches to remove energy from their loads when power is removed from their inputs or they are switched off. This would be especially useful when loads contain motors moving mechanical elements that need to be brought to a halt to protect mechanics and human operators when power is removed or shut off. It's also important when the charge on capacitors within a load represents a shock and/or energy hazard (e.g., which are exposed when an interlock switch shuts off power when a guard is removed). Where human safety is concerned, such an energy removal apparatus would also benefit from fault tolerant operation, possibly using more than one energy removal method.

SUMMARY OF THE INVENTION

The invention is a DC output power converter or DC switch device that includes methods and apparatus to reverse the current in the connected load, thereby draining the load's energy until the voltage in the load is brought to a (near) zero potential and held there.

DETAILED DESCRIPTION OF THE INVENTION

The invention is a DC output power converter or DC switch device that includes methods and apparatus to reverse the current in the connected load, thereby draining the load's energy to an energy sink, until the voltage in the load is brought to a (near) zero potential and held there. The energy sink can be one or more of the following:

1. a storage capacitor and inductor
2. a resistive dissipating element,
3. the incoming power source.

Figure 1:
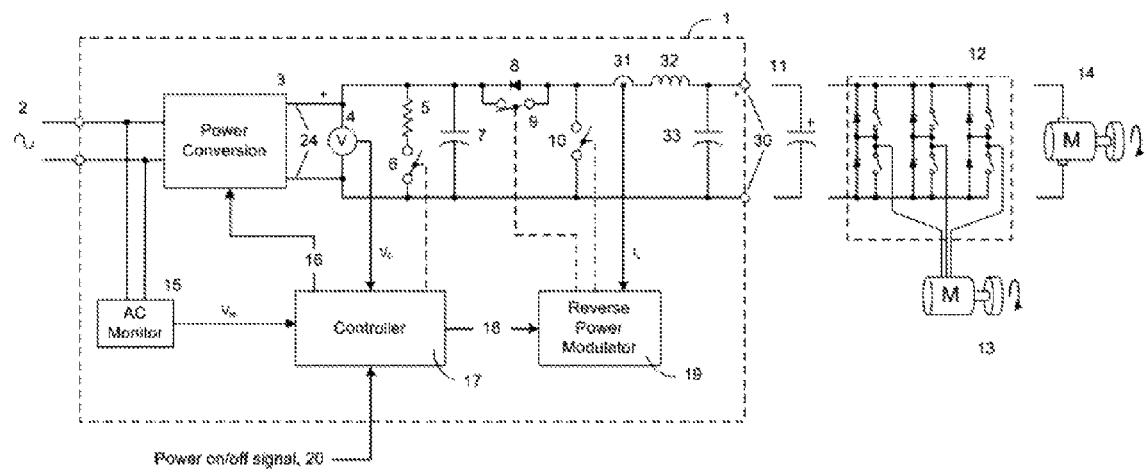
FIG. 1 illustrates an AC-DC converter embodying the invention.
Figure 2:
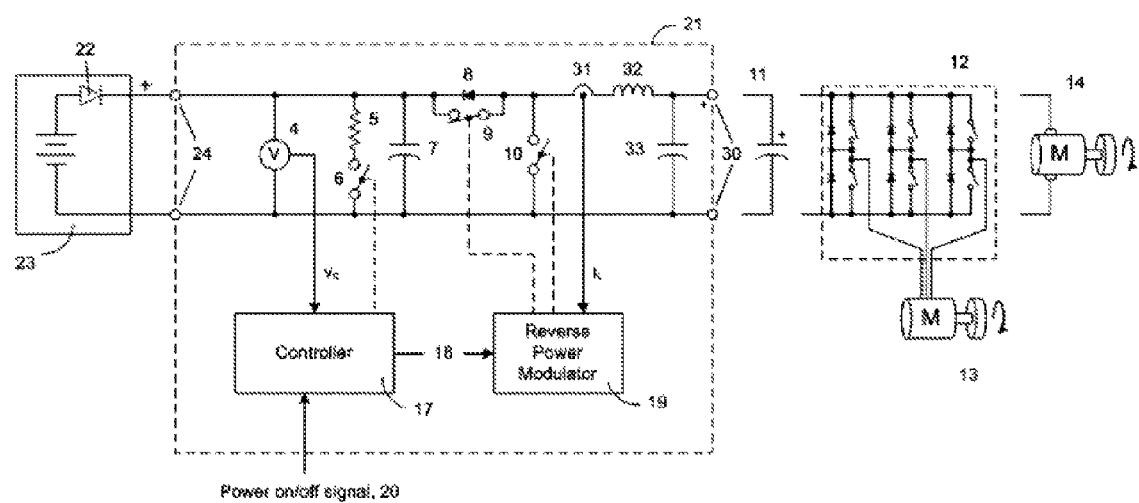
FIG. 2 illustrates a second embodiment of the invention

As can be seen in the diagrams of FIGS. 1 and 2, the novel power converter (1) is coupled to a power source—AC line (2) in FIG. 1, or DC source (23) in FIG. 2—and provides a power output such as load terminals (30) for connecting a load such as a capacitive load (11), a motor drive (12) controlling a motor (13), a DC motor (14), or some combination of these types of loads.

One important application of this invention uses one or more of the above techniques with a load that is an electronic motor drive (12). Electronic motor drives (12) apply power to a motor (13) through a switching power stage. Within the motor drive (12), there are switching elements that direct current into the motor. Typically (predominantly) these switching elements have diodes connected in reverse polarity in parallel with them, as is shown diagrammatically in the figures as diodes and switches within drive (12), although it will be understood that any form of motor drive would be applicable.

In normal operation no current flows through the diodes. However, when the motor is moving and current is reversed to the DC power input port of the motor drive load (13), the motor now becomes a generator and these diodes form a reverse rectifier, conducting motor currents and removing energy from the attached mechanical load.

Hence, by using a DC output power converter or DC switch that employs this invention with a motor drive connected as a load, this invention can effectively brake the motor and any connected mechanical load without any action being taken by the motor drive.

First Example

AC-DC Converter

FIG. 1 illustrates an AC-DC converter embodying the invention (1) which applies all three methods of load energy removal for purposes of example. It will be understood by one skilled in the art that the invention need not necessarily include all three methods, but may incorporate one, two or all of the methods as desired.

AC power (2) is applied to power converter stage (3), which converts the AC power to DC at DC supply points (24). The AC power input (2) may be monitored by an AC monitor (15), which measures the voltage (2) and supplies a signal $V_{AC}$ representing the status of the AC input (2) to an input of controller (17).

The power converter (3) has a control input (16) coupled to an output of controller (17), which allows the controller (17) to switch the converter (3) on or off. This converter (3) could be any power supply known to the art, ranging from a simple rectifier to a regulated DC power supply or a switching power supply.

The DC output (24) of the converter (3) is measured by a voltage sensor (4). A storage capacitor (7) is provided across the output of the converter, both for conventional power-filtering reasons and also to act to absorb energy from the load, as described below. The storage capacitor can be a capacitor of sufficient voltage rating for the expected voltage.

A dissipating load (5), such as a power resistor or impedance circuit, is provided across the output (24) of the converter (3). The dissipating load (5) is normally switched out by dump switch (6), which is controlled by controller (17). When the dump switch (6) is closed, the dissipating load (5) dissipates any energy on the converter output (24).

A reverse power modulator (19), controlled by a signal (18) from controller (17), has an input coupled to current sensor (31) for measuring load current $I_L$ and two outputs.

A diode (8) is connected in series with the output (24) of the converter (3). The diode (8) prevents current flow from the power converter (2) to the load (11)-(13), but would allow reverse current flow from the load (11)-(14) to the capacitor (7) and dissipating load (5) when dump switch (6) is closed. The diode (8) is shunted out of the circuit by bypass switch (9), which is controlled by an output of the reverse power modulator (19). When power is to be supplied to the load (11), (12) and/or (14), the reverse power modulator (19) causes the switch (9) to close, which permits current from the power converter (2) to bypass the diode (8).

Clamp switch (10) is connected across the load, controlled by an output of the reverse power modulator (19). When clamp switch (10) is closed and bypass switch (9) is open, current from the load flows through the clamp switch (10).

An inductor (32) is provided in series with the load. The inductor (32) will provide a conventional current-smoothing function, as well as serving to inductively store energy from the load, as will be described in more detail below.

An additional capacitor (33) may be provided at the load terminals (30) for filtering or noise bypass purposes, as is known to the art.

Second Example

DC Power Switch

FIG. 2 illustrates a simpler embodiment of the invention which is useful where a source of DC exists at the correct voltage and with sufficient current capability to power a DC load without having to convert it from AC.

In this example, the power converter (3) and AC monitor (15) of FIG. 1 are omitted, and the circuit of the invention (21) is directly supplied by DC (24) from an external DC supply (23). This DC supply could be, for example, a battery (as shown schematically in the figure), a rectifier, an external regulated power supply or switching supply fed from the AC line, a generator, or any other DC power source known to the art.

If the DC supply (23) is of a kind which cannot accept reverse current, a blocking diode (22) may optionally be provided.

The other elements of the circuit (21) are the same as described the circuit (1) of the first example, above, and will not be separately described herein. Elements in FIG. 2 which are the same as the corresponding elements in FIG. 1 bear the same reference number in both figures.

Operation of the Invention

A user of the equipment will indicate that the power to the load should be turned on by asserting the Power on/off signal (20). This might be a switch closure, or a command from downstream equipment, or from a computer controller, or some other mechanism known to the art.

When the power on/off signal (20) is switched to the "on" state, the controller (17) puts a signal on the output (18) connected to reverse power modulator (19), which in turn puts a signal on its output connected to close bypass switch (9), which bypasses reversed diode (8).

If the system uses a power converter (3) and AC supply (2) as in FIG. 1, the controller (17) may first check that acceptable AC power is applied from the source (2) by looking at the $V_{AC}$ signal from the AC monitor (15) before putting out the signal (18). If the $V_{AC}$ signal indicates that AC power status is acceptable, then signal (18) may be asserted.

With diode (8) bypassed, power then flows from the DC terminals (24) to the output terminals (30), and then to the DC load. The load might be, for example, a capacitive load (11), a motor drive (12) controlling a motor (13), a DC motor (14), or some combination of these.

When the user desires to shut down the power to the load, the Power on/off signal (20) will be switched to the "off" state. When the controller (17) detects this or, in the AC supply example of FIG. 1, if there is a failure of the AC power (2) detected by AC monitor (15), the controller (17) turns off the power converter (3) through signal (16), in the embodiment with AC supply to a power converter.

Where the load energy power removal must be assured, e.g., to protect the safety of human operators the power on/off signal (20) should be constructed to be fault tolerant using at least two input circuits so when both input circuits do not agree the invention will inhibit the forward operation of the power conversion stage (3), initiate the operation of the reverse power modulator (19) and close the dump switch (6).

It also switches signal (18) to direct the reverse power modulator (19) to begin reverse current flow in the load (11), (12) and/or (14). This reverse current flow may be accomplished by one or more of three methods, described in detail below.

Method 1. Transfer Energy from the Load to a Storage Capacitor and Inductor

Figure 3:
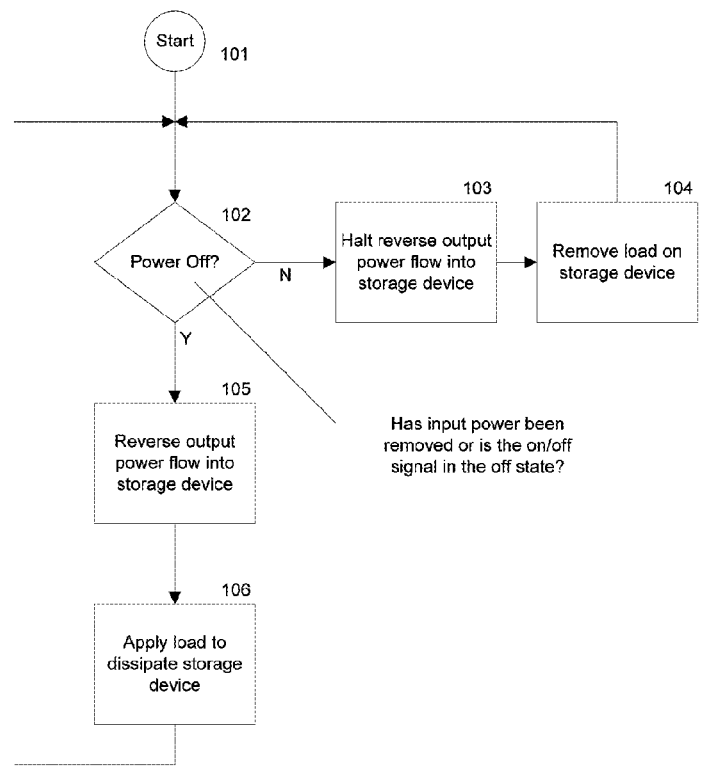
FIG. 3 diagrams the method for transferring energy from the DC load into a storage device and loading that storage device to dissipate the energy.

This method is shown in detail in the flowchart of FIG. 3.

102. If the power on/off signal is set to "on", then:
    103. the bypass switch (9) is closed and forward current is supplied to the load (11), (12) or (13); and
    104. dump switch (6) is open, and dissipating load (5) is removed from the capacitor (7).

102. If the power on/off signal is set to "off", then:
    105. Upon receiving the signal (18) that power is to be turned off, the reverse power modulator (19) opens the bypass switch (9).
    105. Power from the load (11), (12) and/or (14) charges the storage capacitor (7) through inductor (32) and diode (8). The reverse power modulator (19) turns the clamp switch (10) on and off in a sequence that keeps the reverse current below a pre-set limit as measured by sensor (31).

The on and off sequencing of the clamp switch (10) transfers power from the load (11), (12) and/or (14) to the storage capacitor (7) in the following way:

When the clamp switch (10) is closed reverse load current flows, storing energy in the inductor (32).

When the current sensor (31) detects that the inductor (32) current reaches the pre-set current limit, the clamp switch (10) is opened.

The reverse current flows between the load (11), (12) and/or (14) and the storage capacitor (7) until some or all of the energy stored in inductor (32) is dissipated.

The reverse current modulator closes the clamp switch (10), and the sequence repeats until the load voltage is reduced close to or at zero volts (indicating near complete energy removal).

The clamp switch (10) is then held closed so long as the load current remains below the pre-set current limit.

Figure 4:
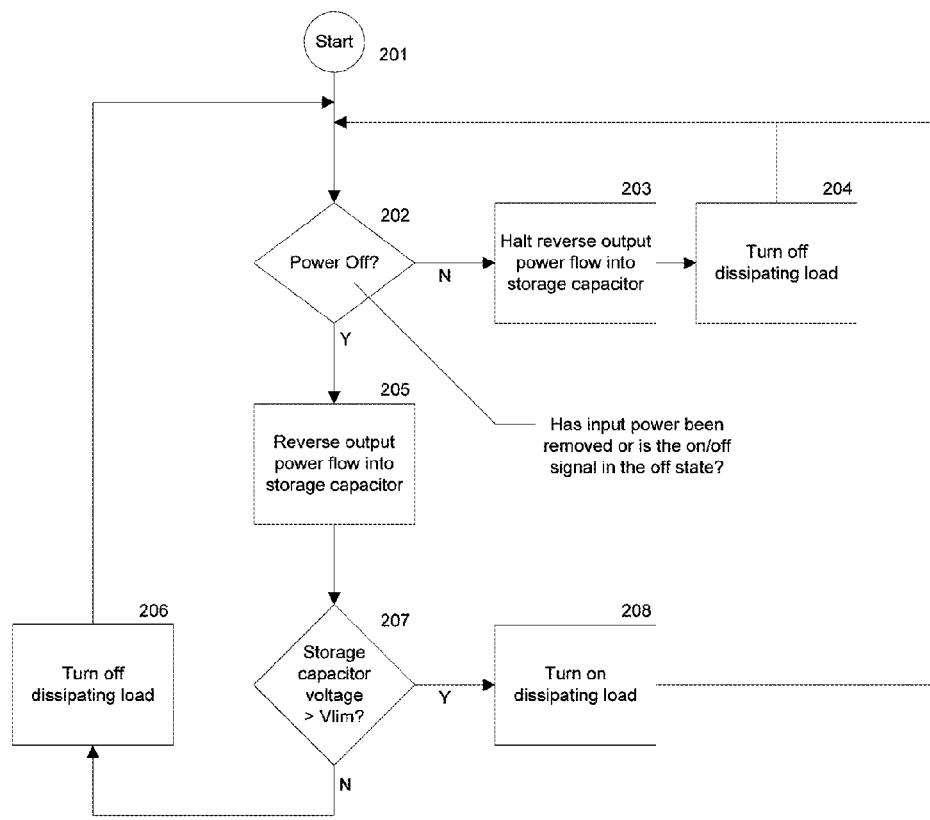
FIG. 4 diagrams a method for transferring energy from the DC load into a storage capacitor and then loading that capacitor with a dissipating load when the capacitor is charged up beyond a certain voltage (energy) limit.

Method 2. Transfer Energy from the Load to a Resistive Dissipating Element,

This method is shown in detail in the flowchart of FIG. 4.

202. If the power on/off signal is set to "on", then:
 203. the bypass switch (9) is closed and forward current is supplied to the load (11), (12) or (13); and
 204. dump switch (6) is open, and dissipating load (5) is removed from the capacitor (7).

202. If the power on/off signal is set to "off", then:
 205. Upon receiving the signal (18) that power is to be turned off, the reverse power modulator (19) opens the bypass switch (9).
 205. Power from the load (11), (12) and/or (14) charges the storage capacitor (7) through inductor (32) and diode (8). The reverse power modulator (19) turns the clamp switch (10) on and off in a sequence that keeps the reverse current below a pre-set limit as measured by sensor (31).
 207. If, during the modulation sequence of the clamp switch (10), the controller (17) detects through voltage sensor (4) that the voltage in the storage capacitor (7) is increased above a pre-set voltage limit, it will:
  208. close the dump switch (6), switching in the dissipating load (5) to dissipate some or all of the energy in the storage capacitor (7).
 206. When the energy in the storage capacitor is sufficiently dissipated, the dump switch (6) is opened to remove the dissipating load (5) and allow energy to charge capacitor (7) once again.

Method 3. Transfer Energy from the Load to the Incoming Power Source.

In the embodiment using a DC power source, as shown in FIG. 2, the circuit can transfer energy from the load directly back into the DC source (23), if the source is of the kind which can accept such energy. For example, a storage battery would be able to accept a charge from the load.

This method can also be used in the embodiment with AC supply and a power converter (3) as shown in FIG. 1 if the power converter (3) is bi-directional, for example, a converter using active switches to rectify AC as opposed to normal diodes. Such a converter could be directed to deplete the charge in the storage capacitor (7) or accept the reverse current from the load through diode (8) to generate power into the AC line (2), instead of dissipating the load energy through dissipating load (5) and dump switch (6).

Figure 5:
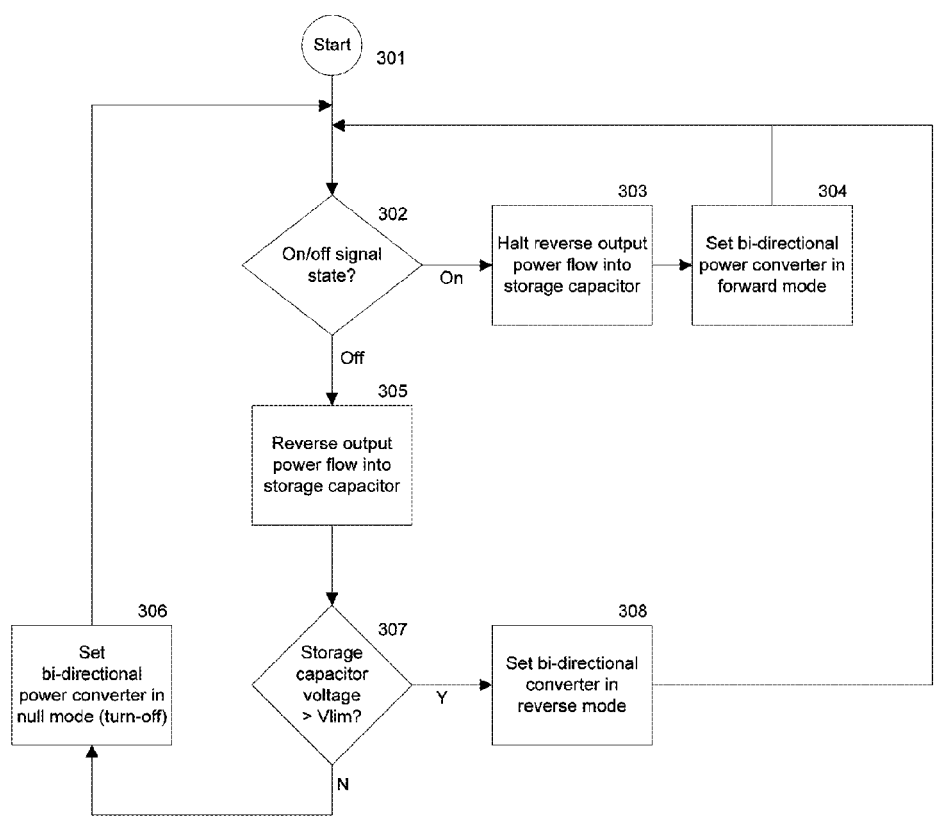
FIG. 5 diagrams a method that can be used when the invention contains a bi-directional power converter transferring the load's energy to the power source.
Figure 3:
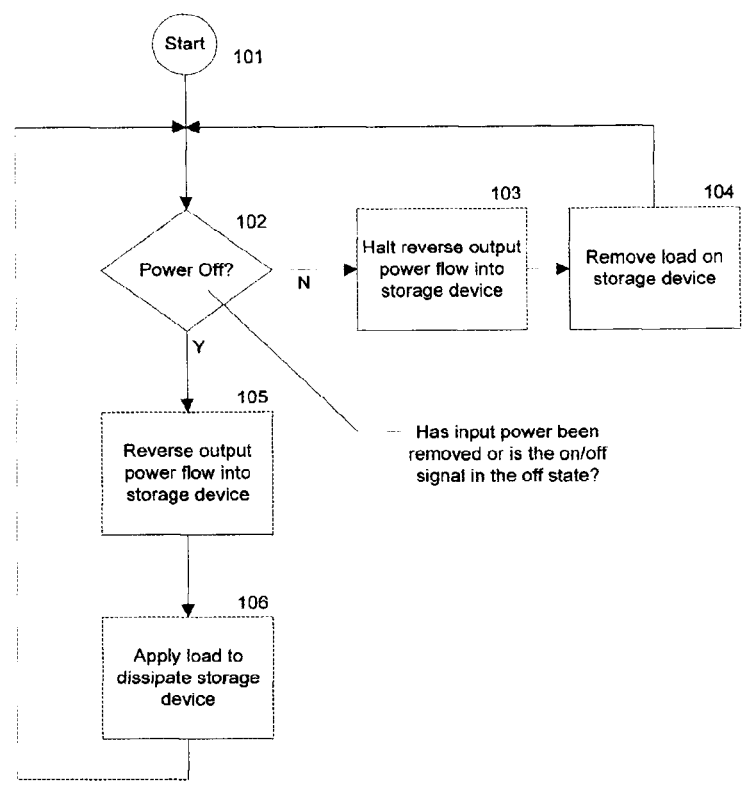
Figure 4:
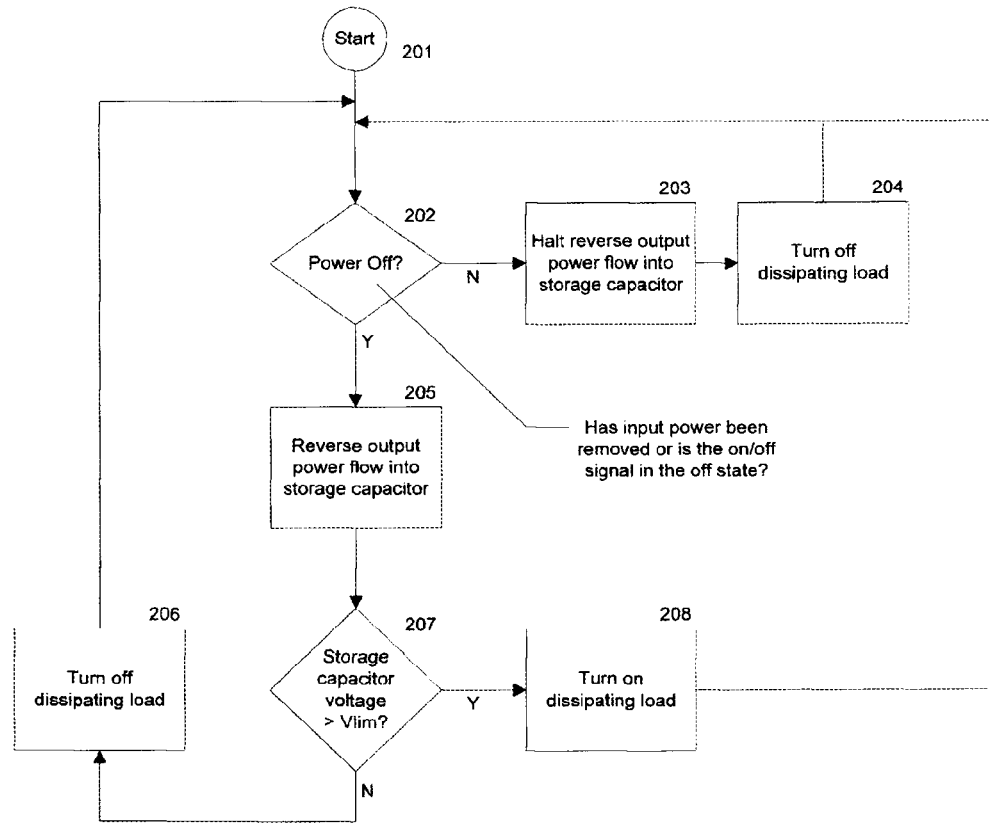

This method is shown in detail in the flowchart of FIG. 5.

302. If the power on/off signal is set to "on", then:
 303. the bypass switch (9) is closed and forward current is supplied to the load (11), (12) or (13); and
 304. in the embodiment of FIG. 1 with a bi-directional power converter, the power converter (3) is switched to forward mode.

302. If the power on/off signal is set to "off", then:
 305. Upon receiving the signal (18) that power is to be turned off, the reverse power modulator (19) opens the bypass switch (9).
 305. Power from the load (11), (12) and/or (14) charges the storage capacitor (7) through inductor (32) and diode (8). The reverse power modulator (19) turns the clamp switch (10) on and off in a sequence that keeps the reverse current below a pre-set limit as measured by sensor (31).
 307. If, during the modulation sequence of the clamp switch (10), the controller (17) detects through voltage sensor (4) that the voltage in the storage capacitor (7) is increased above a pre-set voltage limit, it will:
  308. set the bi-directional power converter (if so equipped) into reverse mode to dissipate some or all of the energy in the storage capacitor (7).
 306. When the energy in the storage capacitor is sufficiently dissipated, set the bi-directional power converter (if so equipped) to null mode (turn-off) to allow energy to charge capacitor (7) once again.

In the DC-powered embodiment of FIG. 2, this method can be even simpler. If the DC power source (23) is, for example, a storage battery, the capacitor (7) will discharge into the DC source (23) (assuming there is no reverse current protection (22)), so long as the voltage in the capacitor (7) exceeds that of the source (23). Therefore, the reverse current will not raise the voltage across the storage capacitor (7) above the pre-set voltage limit because it is clamped by the DC source (23). Hence, the controller (17) will not need to connect the dissipating load (5) through the dump switch (6), allowing much of the energy to be recovered. In situations where the DC power switch (21) will be used only with a DC source (23) that will accept reverse current the dissipating load (5), dump switch (6) and the storage capacitor (7) can be omitted.

Optionally, the energy removal method is constructed to be fault tolerant by combining at least two instances of methods 1, 2 or 3 (above) in such a way so that if one instance fails another instance will still remove energy from the load. The on-off command signaling method is preferably constructed in a fault tolerant way such that the normal power flow is inhibited, and any stored energy in any connected loads is removed by reverse current flow in the output whenever a failure is detected within the on-off signaling method.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A DC load removal circuit for use with DC loads, comprising:
 a) a power input for connection to DC power from a power source;
 b) a power output for connection to a DC load;
 c) an energy sink coupled across the power input;
 d) a blocking diode connected between the power input and the power output, oriented such that it blocks current from the power input to the power output but passes reverse current from the power output to the power input;
 e) a bypass switch in parallel with the blocking diode, having a control input, such that when the control input causes the bypass switch to be closed the blocking diode is bypassed and current can flow from the power input to the power output;

f) an inductor connected between the blocking diode and the power output;

g) a clamp switch across the load, connecting a point between the blocking diode and the inductor and a side of the power input, having a control input, such that when the control input causes the clamp switch to be closed, reverse current flows from the load through the inductor and when the clamp switch is open reverse current can flow from the load through the diode to at least the energy sink;

h) a current sensor in the circuit loop of the inductor and the clamp switch, having an output representative of current flowing through the inductor at least when the clamp switch is closed;

i) a controller having an input coupled to a power on/off signal input, and a reverse power signal output;

j) a reverse power modulator, having an input coupled to the reverse power signal output of the controller, an input coupled to the output of the current sensor, an output coupled to the control input of the bypass switch and a control input coupled to the control input of the clamp switch;

the controller being programmed such that when power is to be removed from the power output, the controller sends a signal to the reverse power modulator and the reverse power modulator opens the bypass switch and operates the clamp switch such that reverse current from the load is routed into the energy sink.

2. The circuit of claim 1, in which the energy sink comprises a storage capacitor, such that reverse current from the load is drained to the storage capacitor by the reverse power modulator opening and closing the clamp switch in a sequence that keeps the reverse current below a determined limit as measured by the current sensor, alternately storing energy in the inductor when the clamp switch is closed and storing the energy in the storage capacitor when the clamp switch is open.

3. The circuit of claim 1, in which the energy sink comprises a dissipating load and a dump switch coupled in series across the power input, having a control input coupled to an output of the controller, such that when the dump switch is closed, energy is dissipated by the dissipating load.

4. The circuit of claim 1, in which the energy sink comprises a DC power source connected to the DC power input, such that reverse current from the load is drained to the DC power source.

5. The circuit of claim 1 further comprising a power converter having an AC power input and a DC power output coupled to the power input of the circuit, in which the power converter is bi-directional and comprises the energy sink, such that energy is dissipated by being transferred back to the AC source.

6. The circuit of claim 1, further comprising a power converter having an AC power input and a DC power output coupled to the power input of the circuit.

7. The circuit of claim 6, further comprising an AC monitor having an input coupled to the AC power input and an output coupled to an input of the controller, such that the when the controller detects a failure of AC power, the controller sends a signal to the reverse power modulator and the reverse power modulator opens the bypass switch and operates the clamp switch such that reverse current from the load is drained.

8. The circuit of claim 1, in which the controller determines that power is to be removed from the power output when a power off signal is present at the power on/off input.

9. A method of removing energy from a DC load using a DC load removal circuit comprising a power input for connection to DC power from a power source; a power output for connection to a DC load; an energy sink coupled across the power input; a blocking diode connected between the power input and the power output, oriented such that it blocks current from the power input to the power output but passes reverse current from the power output to the power input; a bypass switch in parallel with the blocking diode, having a control input, such that when the control input causes the bypass switch to be closed the blocking diode is bypassed and current can flow from the power input to the power output; a clamp switch across the load, connecting a point between the blocking diode and the inductor and a side of the power input, having a control input, such that when the control input causes the clamp switch to be closed, reverse current flows from the load through the inductor and when the clamp switch is open reverse current can flow from the load through the diode to the energy sink; a current sensor in the circuit loop of the inductor and the clamp switch, having an output representative of current flowing through the inductor at least when the clamp switch is closed; a controller having an input coupled to the voltage sensor, a power on/off signal input, and a reverse power signal output; and a reverse power modulator, having an input coupled to the reverse power signal output of the controller, an input coupled to the output of the current sensor, an output coupled to the control input of the bypass switch and a control input coupled to the control input of the clamp switch;

the method comprising:
when a power off signal is present at the power on/off input, the controller sending a signal to the reverse power modulator;
the reverse power modulator opens the bypass switch; and
the reverse power modulator operating the clamp switch such that reverse current from the load is drained to an energy sink.

10. The method of claim 9, in which the energy sink is a storage capacitor, and the step of draining the reverse current from the load comprises:
the reverse power modulator opening and closing the clamp switch in a sequence that keeps the reverse current below a determined limit as measured by the current sensor, alternately storing energy in the inductor when the clamp switch is closed and storing the energy in the storage capacitor when the clamp switch is open.

11. The method of claim 10, further comprising a dissipating load and a dump switch coupled in series across the power input, having a control input coupled to an output of the controller, and the method further comprises monitoring a voltage of the storage capacitor, and when the voltage exceeds a determined value, closing the dump switch, dissipating energy in the storage capacitor in the dissipating load.

12. The method of claim 9, in which the energy sink comprises a dissipating load and a dump switch coupled in series across the power input, and the step of draining the reverse current from the load comprises closing the dump switch to dissipate energy by the dissipating load.

13. The method of claim 9, in which the energy sink comprises a DC power source connected to the DC power input, and the step of draining the reverse current from the load comprises routing reverse current from the load to the DC power source.

14. The method of claim 9 in which the circuit further comprises a power converter having an AC power input and a DC power output coupled to the power input of the circuit.

15. The method of claim 14, in which the circuit further comprises an AC monitor having an input coupled to the AC power input and an output coupled to an input of the controller, and the method further comprises when the controller detects a failure of AC power, the controller sends a signal to the reverse power modulator and the reverse power modulator opens the bypass switch and operates the clamp switch such that reverse current from the load is drained.

16. The method of claim 14, in which the power converter is bi-directional and comprises the energy sink, and the step of draining the reverse current from the load comprises transferring reverse current from the load back to the AC source.

* * * * *

UNITED STATES PATENT AND TRADEMARK OFFICE
CERTIFICATE OF CORRECTION

PATENT NO. : 8,004,866 B2
APPLICATION NO. : 12/346095
DATED : August 23, 2011
INVENTOR(S) : Bucella et al.

It is certified that error appears in the above-identified patent and that said Letters Patent is hereby corrected as shown below:

Delete drawing sheet 2 of 3, figures 3 & 4 and insert replacement drawing sheet 2 of 3, figures 3 & 4.

Signed and Sealed this
Twenty-fifth Day of October, 2011

David J. Kappos
*Director of the United States Patent and Trademark Office*